US 7,460,652 B2

(12) United States Patent
Chang

(10) Patent No.: US 7,460,652 B2
(45) Date of Patent: Dec. 2, 2008

(54) VOICEXML AND RULE ENGINE BASED SWITCHBOARD FOR INTERACTIVE VOICE RESPONSE (IVR) SERVICES

(75) Inventor: Hisao M. Chang, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 67 days.

(21) Appl. No.: 10/672,292

(22) Filed: Sep. 26, 2003

(65) Prior Publication Data
US 2005/0069102 A1    Mar. 31, 2005

(51) Int. Cl.
*H04M 11/00*    (2006.01)
(52) U.S. Cl. .................. 379/88.18; 379/71; 379/212.01; 379/265.02
(58) Field of Classification Search ................ 379/67.1, 379/88.13, 88.16, 88.17, 88.18, 114.01, 114.13, 379/219, 220.01, 265.01–266.04, 88.02
See application file for complete search history.

(56) References Cited

U.S. PATENT DOCUMENTS

| | | |
|---|---|---|
| 4,953,204 A | 8/1990 | Cuschelg, Jr. et al. |
| 4,967,405 A | 10/1990 | Upp et al. |
| 5,335,269 A | 8/1994 | Steinlicht |
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Liao et al. |
| 5,652,789 A | 7/1997 | Miner et al. |
| 5,729,600 A * | 3/1998 | Blaha et al. ............. 379/266.07 |

(Continued)

FOREIGN PATENT DOCUMENTS

EP    0 424 015 A2    4/1991

(Continued)

OTHER PUBLICATIONS

Ogino, Tsukasa, et al., "Technologies for Internet Infrastructure: Eliminating the World Wide Wait," iNet Japan, Jul. 18-21, 2000, www.isoc.org/inet2000/cdproceedings/lg/index.

(Continued)

*Primary Examiner*—Fan Tsang
*Assistant Examiner*—Simon Sing
(74) *Attorney, Agent, or Firm*—Toler Law Group

(57) ABSTRACT

The present application discloses a call routing system and a method of communicating with a call originator. The call routing system includes a voice converted data module having an input to receive an incoming call, an interactive voice response dialog module responsive to the voice converted data module; and a call routing module responsive to the voice converted data module. The call routing module is to route the incoming call to a destination. The method of communicating with an originator of a call includes receiving a call at an automated call handling system; performing an evaluation of the call based on a set of business rules; routing the call to an interactive voice response unit based on the evaluation, and in response to the call, automatically scheduling and sending an email to the originator of the call. The email includes a targeted communication message relating to the subject matter of the call.

17 Claims, 5 Drawing Sheets

U.S. PATENT DOCUMENTS

| | | | |
|---|---|---|---|
| 5,754,639 A | 5/1998 | Flockhart et al. | |
| 5,754,978 A | 5/1998 | Perez-Mendez et al. | |
| 5,923,745 A | 7/1999 | Hurd | |
| 5,940,476 A | 8/1999 | Morganstein et al. | |
| 5,946,377 A * | 8/1999 | Wolf | 379/88.22 |
| 5,946,388 A | 8/1999 | Walker et al. | |
| 5,953,704 A | 9/1999 | McIlroy et al. | |
| 5,999,965 A | 12/1999 | Kelly | |
| 6,002,689 A | 12/1999 | Christie et al. | |
| 6,002,760 A | 12/1999 | Gisby | 379/266.01 |
| 6,003,011 A | 12/1999 | Sarin et al. | |
| 6,038,293 A * | 3/2000 | McNerney et al. | 379/88.19 |
| 6,044,146 A * | 3/2000 | Gisby et al. | 379/266.02 |
| 6,049,594 A | 4/2000 | Furman et al. | |
| 6,118,866 A | 9/2000 | Shtivelmann | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | 379/266.01 |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | 379/221.08 |
| 6,366,668 B1 | 4/2002 | Borst et al. | |
| 6,377,662 B1 * | 4/2002 | Hunt et al. | 379/88.01 |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | 379/88.18 |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,113 B1 | 4/2003 | Dhir et al. | 379/265.02 |
| 6,570,967 B2 | 5/2003 | Katz | |
| 6,584,180 B2 | 6/2003 | Nemoto | |
| 6,587,556 B1 | 7/2003 | Judkins et al. | 379/219 |
| 6,598,021 B1 * | 7/2003 | Shambaugh et al. | 704/270 |
| 6,598,136 B1 | 7/2003 | Norrod et al. | |
| 6,600,736 B1 * | 7/2003 | Ball et al. | 370/352 |
| 6,603,854 B1 | 8/2003 | Judkins et al. | 379/265.06 |
| 6,614,781 B1 | 9/2003 | Elliott et al. | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,782,412 B2 * | 8/2004 | Brophy et al. | 709/204 |
| 6,792,096 B2 | 9/2004 | Martin et al. | |
| 6,798,876 B1 * | 9/2004 | Bala | 379/265.12 |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,925,155 B2 * | 8/2005 | Reynolds et al. | 379/88.05 |
| 6,963,983 B2 | 11/2005 | Munson et al. | |
| 6,999,755 B2 * | 2/2006 | Park | 455/414.1 |
| 7,006,605 B1 | 2/2006 | Morganstein et al. | |
| 7,031,444 B2 | 4/2006 | Shen et al. | |
| 7,035,388 B2 | 4/2006 | Kurosaki et al. | |
| 7,130,411 B2 * | 10/2006 | Brown et al. | 379/266.01 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0057678 A1 * | 5/2002 | Jiang et al. | 370/353 |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0026409 A1 * | 2/2003 | Bushey et al. | 379/265.02 |
| 2003/0035381 A1 | 2/2003 | Chen et al. | |
| 2003/0035516 A1 * | 2/2003 | Guedalia | 379/88.16 |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth et al. | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2003/0235282 A1 * | 12/2003 | Sichelman et al. | 379/201.03 |
| 2003/0235287 A1 * | 12/2003 | Margolis | 379/265.01 |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |

| | | |
|---|---|---|
| 2004/0066416 A1 | 4/2004 | Knott et al. |
| 2004/0073569 A1 | 4/2004 | Knott et al. |
| 2004/0083479 A1* | 4/2004 | Bondarenko et al. ........ 719/310 |
| 2004/0088285 A1 | 5/2004 | Martin et al. |
| 2004/0103017 A1 | 5/2004 | Reed et al. |
| 2004/0109555 A1 | 6/2004 | Williams |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1* | 9/2004 | Knott et al. ............ 379/266.01 |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0018825 A1 | 1/2005 | Ho et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub et al. |
| 2006/0072737 A1 | 4/2006 | Paden et al. |
| 2006/0177040 A1 | 8/2006 | Mitra et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 11/086,794, filed Mar. 22, 2005.
U.S. Appl. No. 11/144,375, filed Jun. 3, 2005.
U.S. Appl. No. 11/200,870, filed Aug. 10, 2005.
U.S. Appl. No. 11/214,451, filed Aug. 29, 2005.
U.S. Appl. No. 11/267,593, filed Nov. 4, 2005.
U.S. Appl. No. 10/898,722, filed Jul. 23, 2004.
U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 10/975,023, filed Oct. 27, 2004.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

VOICEXML AND RULE ENGINE BASED SWITCHBOARD FOR INTERACTIVE VOICE RESPONSE (IVR) SERVICES

FIELD OF THE DISCLOSURE

This disclosure relates generally to telecommunication systems in both public or private circuit-switched telephone networks (PSTN) and Internet-based Voice-over-IP (VoIP) networks

BACKGROUND

Certain early work in call routing technologies are based on previous generations of interactive voice response (IVR) platforms where sharing a centralized business logic and decision source among hundreds of isolated IVR systems within an enterprise is not technically feasible. When calls come to one IVR node, the business logic that decides where to route the call to another IVR node or live agent is hardwired into the service logic being executed on that node. It is difficult to maintain the consistency or update such business logic for any enterprise with a large number of IVR platforms installed in multiple locations.

More recent systems use automatic call distribution (ACD) using a proprietary application programming interface (API) in conjunction with various computer telephony interface (CTI) technologies. The routing logic in the ACD is hardcoded in software programs running on the ACD. Similarly, when one IVR decides to send the call to another IVR or to a live agent via CTI, it cannot access up-to-the-minute business logic in order to determine the best routing strategy. Instead, individual IVRs rely on their own routing table which reside on individual servers. When there are multiple ACD nodes and dozens of IVR platforms across an enterprise call center environment, it is very difficult to maintain a common image across all of these routing tables to reflect a centralized business logic on a real-time basis.

Accordingly, there is a need for an improved system and method of handling calls in an enterprise call center environment.

DETAILED DESCRIPTION

The present application discloses a call routing system and a method of communicating with a call originator. The call routing system includes a voice converted data module having an input to receive an incoming call, an interactive voice response dialog module responsive to the voice converted data module; and a call routing module responsive to the voice converted data module. The call routing module is to route the incoming call to a destination. The method of communicating with an originator of a call includes receiving a call at an automated call handling system; performing an evaluation of the call based on a set of business rules; routing the call to an interactive voice response unit based on the evaluation, and in response to the call, automatically scheduling and sending an email to the originator of the call. The email includes a targeted communication message relating to the subject matter of the call.

Figure 1:
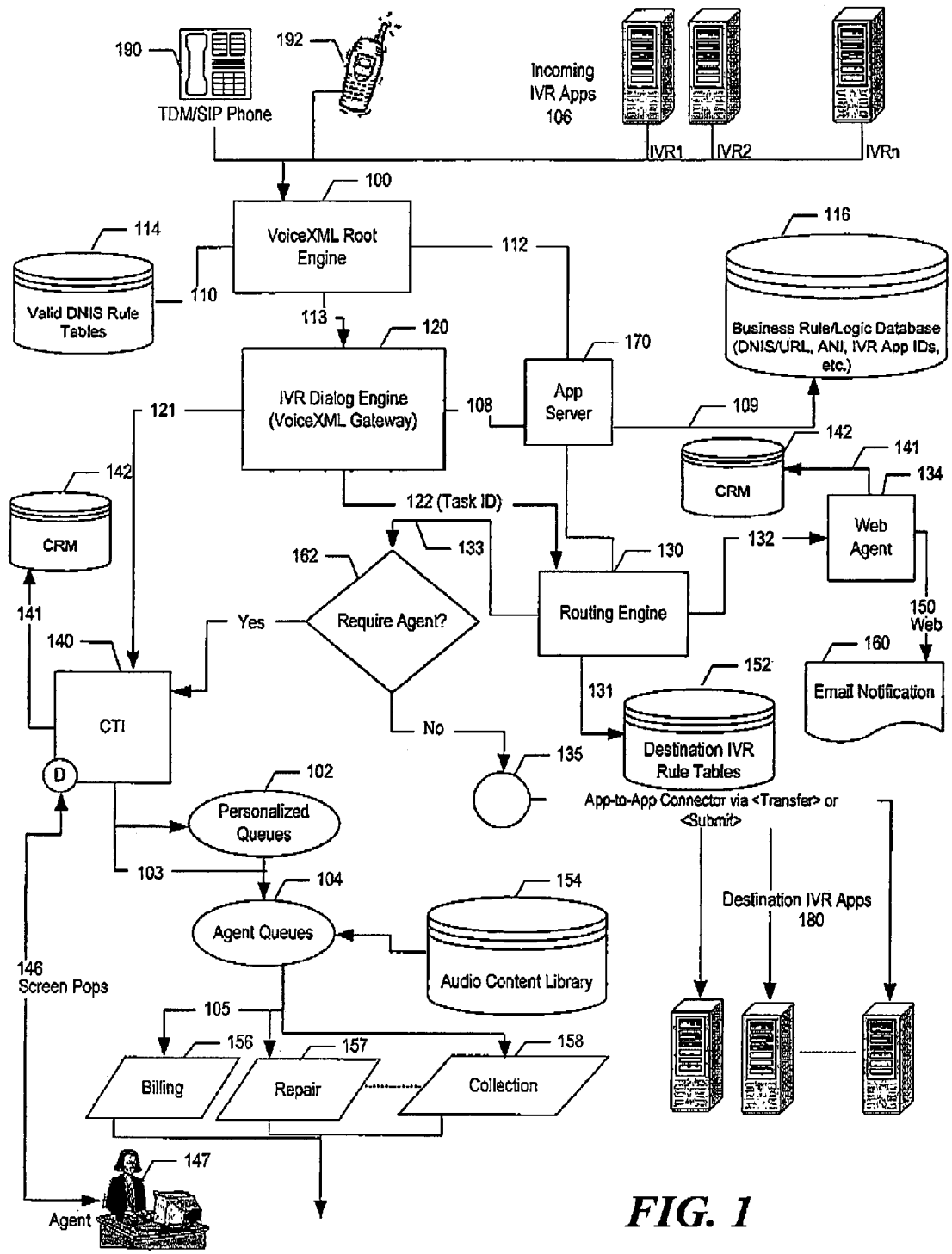
FIG. 1 is a block diagram of a system for handling calls.

The disclosed system provides a VoiceXML based software-driven switchboard powered by multiple rule engines that routes calls from one source to another. Referring to FIG. 1, a system for handling calls is shown. The system includes a voice converted data module (e.g. VoiceXML root engine 100), an IVR dialog engine 120, and a routing engine 130. The VoiceXML root engine 100, the IVR dialog engine 120, and the routing engine 130 are all coupled to an application server 170. The application server 170 is coupled to a database 116 to store business roles and logic. The VoiceXML root engine 100 is coupled to a second database 114 which includes DNIS rule tables. The VoiceXML root engine 100 is coupled to the application server 170 via connection 112 and is coupled to the DNIS rule table 114 via a connection 110. The VoiceXML root engine 100 is coupled to the IVR dialog engine 120 via connection 113. The VoiceXML root engine 100 has an input responsive to various incoming IVR applications 106 (IVR1, IVR2 to IVRn), internet-based telephony systems and time division multiplexing (TDM) telephony systems such as the session internet protocol (SIP)/TDM phone 190, and wireless telephony systems, such as a wireless communication device 192. The IVR dialog engine 120 is coupled to a computer telephony interface (CTI) 140 via connection 121. The computer telephony interface (CTI) 140 is coupled to a customer relationship management (CRM) database 142 via connection 141. Connection 141 may carry a telephone number request and may retrieve customer information related to that telephone number from the CRM 142.

The CTI 140 is coupled to an agent terminal 147 via connection 146 and is coupled to a personalized call hold queue 102. The personalized queue 102, is routed to agent queues 104 having access to an audio content library 154. The agent queue 104 may be routed to particular types of automated call handling systems, such as billing system 156, repair system 157, and collection system 158. These subject matter based call handling systems may route calls to an agent terminal to provide customer assistance. Alternatively, the subject matter call handling systems may be connected to interactive voice response units to provide automated and computer generated responses to customer inquiries.

The routing engine 130 is coupled to an internet connection 150 via web agent 134 and connection 132. The web agent 134 may provide a telephone number 141 to customer relationship management database 142 for the retrieval of additional information associated with the telephone number for a given customer. An example of such information includes a customer history, prior transactions, address, name and call profile preferences. The web agent 134, via the web interface 150, may provide electronic communication such as email notifications 160. The routing engine module 130 is coupled to a destination IVR rule table 152 via connection 131. In addition, the routing engine 130 is connected to logic, at decision step 162, to determine whether a live agent is required, at decision step 162 for further processing of calls being handled. Where an agent is required, processing continues from decision block 162 to CTI 140, and where an agent is not required, processing continues to processing block 135 for an application to application connection to a designated destination IVR application 180.

Based on a caller profile associated with the telephone number and based on data retrieved from the CRM database 142, CTI 140 may set an optional flag for the call that is provided in the agent queue. If a flag is set and the queue is long, the call may be bridged to a selected audio clip stored in the audio content library database 154. A customer with a particular call profile may then receive product information deemed to be interesting to the caller while the caller is waiting in the queue. When a call proceeds to the queue and is routed to an agent terminal 147, a screen pop may be displayed at the agent terminal 147 which is initiated by CTI 140. The screen pop may contain specific information associated with the caller's telephone number and may be automatically populated on the agent screen based on customer information retrieved from the CRM database 142. An example of such information is a customer size category such as small business, individual or large business and preferred call treatment.

The disclosed system provides a VoiceXML based software-driven switchboard powered by multiple rule engines that routes calls from one source to another. The switchboard offers four basic programmable paths as follows:

| Path No. | Name | Origination | Destination |
|---|---|---|---|
| 1 | D2I | callers dial Directly into the switchboard | → Another IVR app |
| 2 | I2I | callers came from another IVR app | → Another IVR app |
| 3 | D2A | callers dial Directly into the switchboard | → Agent |
| 4 | I2A | callers came from another IVR app | → Agent |

Switching logic inside the system is downloadable over the web from a centralized data source containing business logic and/or rules using standard HTTP interface. This data source 116 may be managed by a relational database management system or emerging technologies such as XML server (or XML database). The business logic database 116 may include rules based on the caller's telephone number, time of day, type of services interest to them in the past, their personal profile, and the customer segmentation (mid-class, upper-middle-class, high-rollers, etc.). The business logic database 116 may also contain a location driven rule subset such that the switchboard can use location information associated with the call to determine whether the caller is physically closer to a particular facility. The location information may be acquired using a WIFI or wireless DSL network. For example, if the caller (while visiting the new city) asks for a top-10 movie, the switchboard can pre-load a list of the theaters nearby that show that particular movie the subsequent dialog can provide relevant information to the caller. Because the system may be built as a web server, an enterprise can choose to deploy multiple systems that can present the same "image" to all callers by using the trigger-based refreshing mechanism supported by VoiceXML Root Engine 100. Such a trigger could be a scheduled event such as loading new switching logic every Sunday at 2 AM or pulling a new order from a given URL every 30 minutes.

VoiceXML Root Engine 100 is activated on from its idol position by an incoming call. For any call coming from a traditional time division multiplexing (TDM) based telephone network, the TDM network will deliver a DNIS associated with that call. Once activated, the VoiceXML Root Engine 100 first checks if the DNIS is defined in the Valid DNIS Rule Tables 114 for that call period. If not, the switchboard can be pre-programmed to either 1) not to answer the call or 2) play a pre-defined announcement and then terminate the call. If defined, the VoiceXML Root Engine 100 may launch a request via Link 112 to be executed on a J2EE Application Server 100 which in turn triggers a set of business rules and logic stored in Database 116 or encoded in a run-time rule engine residing on the application server.

Based on the business rules/logic matching to the DNIS and telephone number (TN) of the caller, if it is available and confirmed via ANI (automated number identification) or by the incoming IVR, a set of IVR dialogs in the form of VoiceXML pages is sent via Link 108 to IVR Dialog Engine Process 120. Process 120 will then engage a voice dialog with the caller using a set of pre-built statistical language models (SLM) designed specifically for a given DNIS profile. If the caller's request is fully understood by Process 120, it sends a message (Task ID) via Link 122 to Routing Engine 130. Routine Engine decodes the message and determine if the call should be best handled by a live agent. If yes, it tells the switchboard to connect the call to CTI 140.

CTI 140 first checks with Customer Relationship Management (CRM) system 142 using TN via Link 141 associated with the caller. CRM 142 may decide based on the contact history for this customer that a personalized message, for example for consumer customers, or special message should be played to the caller if the Agent queue is relatively long for that time of day. For example, a large number of calls sitting in the Agent Queue for Billing may just want to find out their monthly account balance around a due date window. In this case, CRM 142 can form a text message and put it in a personalized queue process 102 for those selected callers. Process 102 may use advanced text-to-speech (TTS) technology to convert the text message into an audio file. When the caller's turn comes, Process 102 may play that audio file to the caller and send the call to a group queue process 104 identified by Routing Engine 130. Process 104 maintains in real time a Task-ID to Skill-Set mapping table and uses this table to send the call to a specific queue served by a matching skill-qualified agent that is available at that time.

Process 102 may make an advanced reservation via process 104 in order to reserve a slot in the agent queue identified by process 104. For example, for an agent queue, such as a billing queue, with an estimated waiting time of about 5 minutes, process 102 can customize the personalized message to be about 4 minutes and 45 seconds. Thus, after the caller finishes listening to their personalized message, they will be placed in their reserved position in the billing queue for a much short wait time before served by a live agent.

Unlike a personalized queue, for a group queue, such as a generalized billing queue connected via link 105, each of the callers in that queue will hear the same message/music or product announcement while waiting to be connected to an agent. A Task ID obtained by dialog engine module process 120 can be used to dynamically trigger a different group message stored in Audio Content Library 154. For example, if the switchboard suddenly receives a few thousands calls within a very short period of time that are related to broadband Internet connection, a special group message may be invoked for all the calls sitting in the repair queue.

When a CTI 140 detects an idle agent, the CTI 140 sends the call context data via link 146 to the agent's desktop 147 by populating various screen fields. Then, CTI 140 may play a chained message from either the voice recordings of the caller or a number of concatenated TTS-generated audio messages associated with the Task ID. This is known as whisper transfer because the caller will not hear these audio messages while the agent is listening to them. Whisper transfer is particular useful when the data link 146 is not initially available for the implementation of the switchboard in an enterprise call center operation.

If Routing Engine 130 finds a destination IVR application 180 (e.g. IVRa in the drawing) that matches to Task ID, it will check, via link 131 the destination IVR rule tables stored in database 152. Based on the structured rules and the interface template found for that destination IVR application, the switchboard activates a software connector 135 which composes various text and/or audio messages in a format readable by the destination IVR 180. If the destination IVR 180 (e.g. IVRa) is another VoiceXML-based IVR application, connector 135 can use VoiceXML standards based application-to-application connection methods, such as <submit> to pass the call and then release the call from the switchboard. If not, connector 135 can physically transfer the call to the destination IVR 180 (i.e. IVRa) and at the same time pass the call history via in-band or out-band methods.

Figure 2:
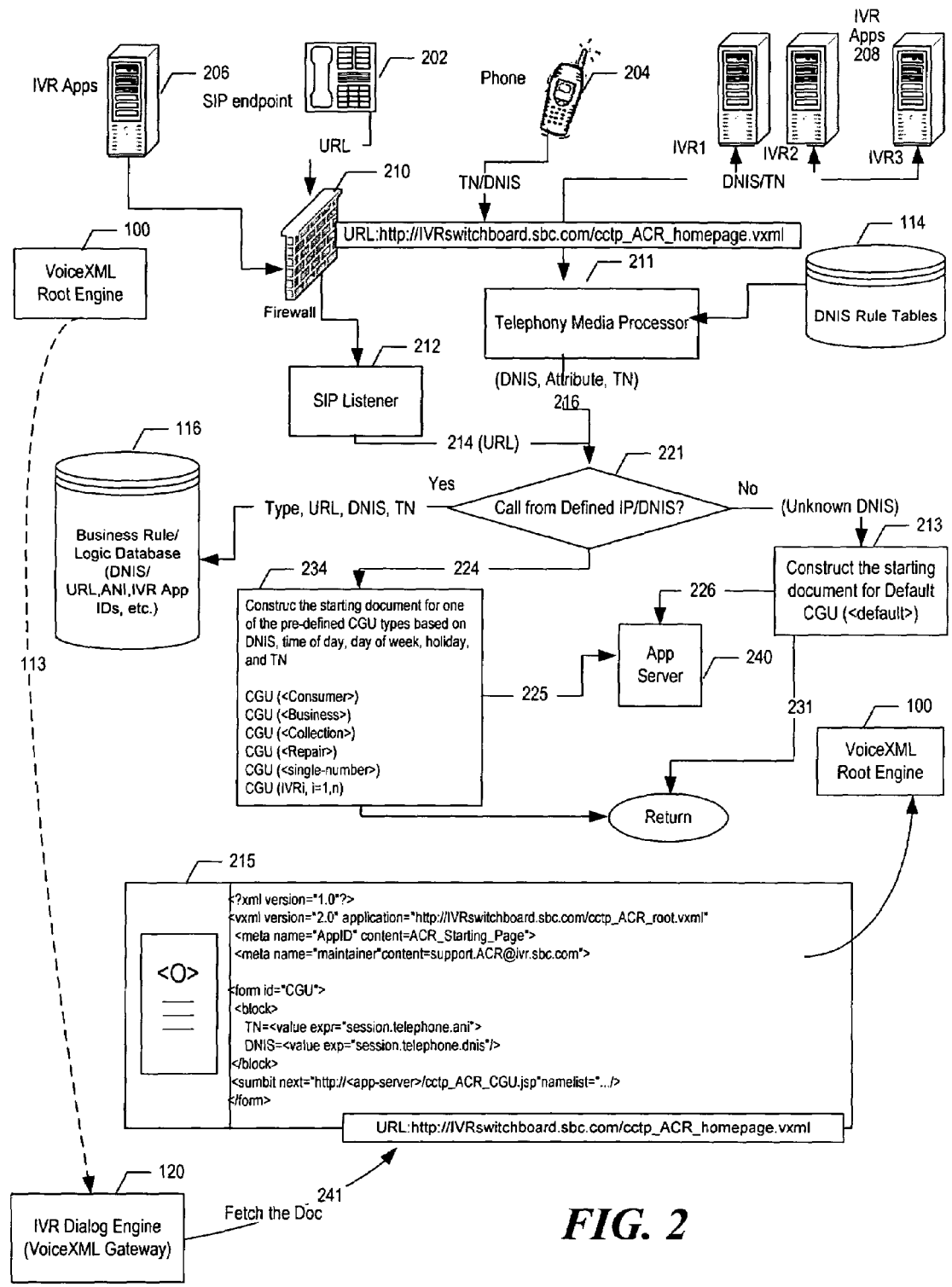
FIG. 2 is a block diagram illustrating further details of a call handling system.

Referring to FIG. 2, further details of a call center system is shown. The system includes IVR applications 206, SIP end point 202, a telephony communication instrument such as phone 204, and various additional IVR applications 208. The communication inputs are received at module 210 which is a switchboard routing module and processing continues for the call treatment to telephony media processor 211 and SIP listener 212. The telephony media processor 211 may retrieve DNIS rule tables from database 114. An output from telephony media processor 211 and SIP listener module 212 is routed to decision logic 221 where it is determined whether the call is defined in the DNIS rule table. When the call is defined in the DNIS table, processing continues by accessing business rule logic database 116. Where the call is not from a defined DNIS, then for the unknown DNIS, processing is routed to module 213 to construct a starting document for a default page. The default page for module 213 is then forwarded to application server 240. Where the call is from a defined DNIS and after the business rule logic and rules have been retrieved from database 116, processing continues to module 234 where a starting document is constructed for pre-defined CGU types based on the DNIS, time of day, day of the week, holiday and telephone number. The resulting page is then forwarded as message 225 to the application server 240.

Also shown in FIG. 2 is an interconnection 113 between the VoiceXML root engine module 100 and the IVR dialog engine module 120. The IVR dialog engine module 120 is used to retrieve a document at the system URL as indicated at 241. In addition, an XML version document 215 is constructed and then passed back to the VoiceXML root engine 100 for additional call processing.

FIG. 2 illustrates detailed processing logic being executed alter a call arrives at the switchboard but before the first prompt is played by the IVR dialog engine 120. For calls coming from a SIP (Session Initiation Protocol) endpoint 202, Root Engine 100 has a built-in firewall to automatically accept or reject a corresponding http request based on their originating host IP address. If the access is granted, an http request will wake up SIP listener process 212 which will then take a proper action. If calls come from a TDM telephone network, it will trigger one of telephony media processors 211 on the switchboard. Process 211 can be pre-programmed to reject certain unknown DNIS, such as by not answering the call at all. In addition to DNIS, the TDM network may also deliver ANI which may or may not correspond to the TN for the calling customer. For SIP calls, the TN is normally delivered as an argument attached to an http request.

If DNIS is not defined in Database 114, decision step 221 will activate process 213, which will construct a VoiceXML document containing the default dialog: CGU (<default>). This default dialog tries to reach customer goal understanding (CGU) without knowing where the call came from (since an associated DNIS is not defined in database 114.)

If DNIS is defined link 216 or SIP call link 214 is determined to have originated from an authorized IP host, the root engine 100 will immediately fetch a starting document 215 from a known web server, or use a cached version. A first actionable tag <vxml> inside document 215 may trigger the switchboard system to fetch a root document written in VoiceXML and then pass it to a built-in VoiceXML run-time interpreter which then executes the processing logic specified in this root VoiceXML document.

If the DNIS is not on the excluded list, process 211 will search Database 114 to determine if there are any special rules associated with this DNIS. Decision 221 may consult Database 116 to determine which CGU dialog should be loaded based on the DNIS/URL and TN. Once a match is found from Database 116, this root document may instruct the switchboard to activate a software constructor 234. Constructor 234 may run on a standard J2EE Application Server. The input link 224 to constructor 234 contains business rules and processing logic defined for a group of DNIS/URL (e.g., all the DNIS associated with a single billing number for that enterprise's customers) and TN if available (from either the caller's AM or passed from an incoming IVR. application (e.g., IVR2 as shown in the drawing). Based on a set of pre-defined CGU dialog templates, constructor 234 builds in real-time a set of dynamic VoiceXML pages and stores the first page at a pre-defined location according to document 215. After that, Root Engine 100 returns control to the switchboard. After the return, the VoiceXML interpreter continues to process the first VoiceXML form (id="CGU") specified in the starting document. The tag <submit> inside the VoiceXML form CGU will cause the switchboard to activate IVR Dialog Engine 120 by fetching the page just generated.

Figure 3:
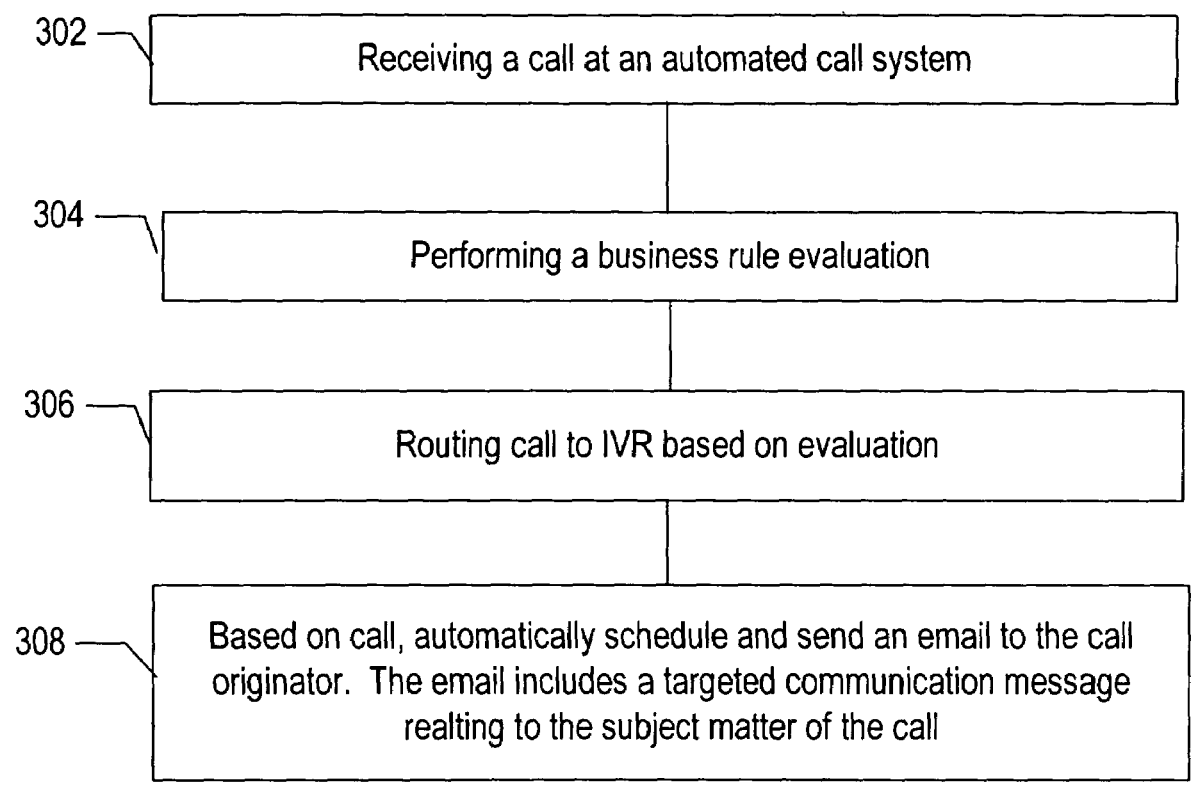
FIG. 3 is a flow chart of a method of handling a call.

FIG. 3 illustrates a method of routing a call and providing follow-up electronic notifications. As shown, a call is received at an automated call system, at 302. An example is a call received at an incoming IVR. A call evaluation based on business logic is then performed, at 304. Based on the call evaluation, the call is routed to a destination IVR or to an agent queue, at 306. The call is then handled by the agent or the destination IVR. In certain situations, a follow-up notification to the caller is desirable. An example is a customized marketing promotion that is matched to certain characteristics of the caller or the subject matter discussed by the caller during the call to the IVR. Based on the call and the caller profile, an electronic notification may be scheduled for delivery at a selected time to send an email to the caller. The email may include a targeted communication message, such as an advertisement or other promotion, that relates to the subject matter of the call processed by the IVR at the call center system, as shown at 308. With this method, permission based targeted marketing programs using email may be automatically distributed and scheduled for callers to a call center. For example, the caller may have a problem that is not solved by a live agent or the destination IVR, such as a customer request for certain information. The electronic notification system may be used to send an email to the caller with the information requested by the caller. The disclosed method may allow for follow-up caller service, enhanced customer care, and cross selling capabilities.

Figure 4:
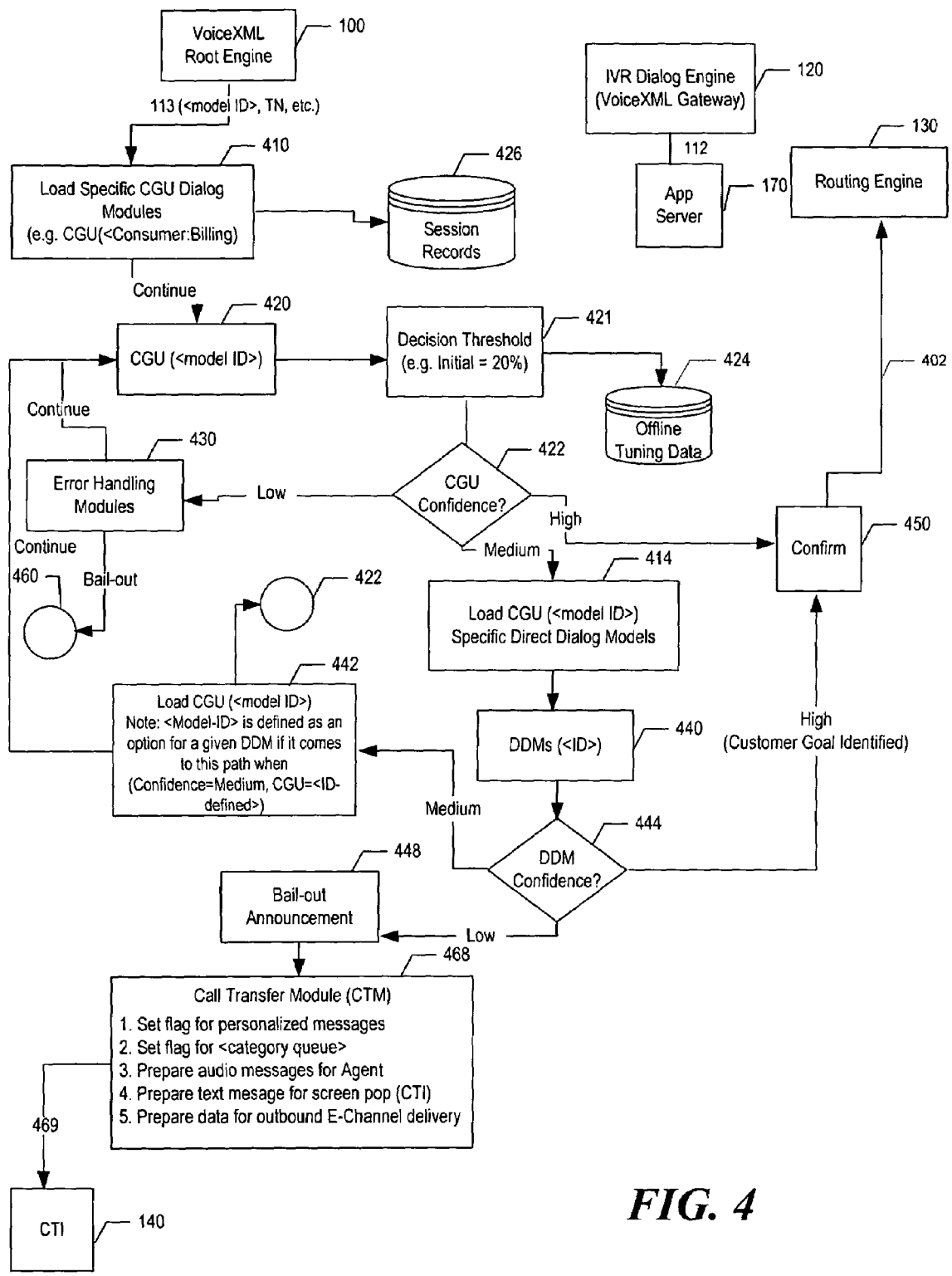
FIG. 4 is a block diagram depicting methods of using an interactive voice response dialog engine module.

Referring to FIG. 4, further details of methods of using an IVR dialog engine module 120 and the call center system are shown. Inputs including the model VoIP telephone number and other data retrieved from VoiceXML routing engine module 100 is received as inputs 113 at the module 410. At 410, specific CGU dialog modules are loaded and session records are stored at the session record database 426. A CGU record is processed at 420 and compared to decision threshold logic, at 421. An initial threshold may be a 20% decision threshold and may require retrieval and access to offline tuning data 424. A CGU confidence determination is made at decision step 422. If the CGU confidence level is low, then error handling module 430 is accessed which may result in a bail out of the process at 460. If the confidence factor at 422 is a medium level, then the CGU is loaded and direct dialog models are handled at 414 and 440. A DDM confidence factor is then checked at decision step 444. Where the CGU confidence level is high, a confirmation occurs at 450 and the routing engine is instructed with message 402 to handle routing of the call, via routing engine 130. Referring again to decision step 444, if the DDM confidence level is low, a bail out occurs at 448 and the call transfer module 326 is accessed to complete the call. If the DDM confidence level is a medium level and a CGU level is loaded at 442, the processing continues at 422. In addition, the call transfer module 468 provides instructions 469 to the CTI 104 as described above.

As shown in FIG. 4, process 410 reads a call profile created dynamically by VoiceXML Root Engine 100 for each call. The call profile specifies which CGU dialog modules should be used for this caller (if TN is available) or for any caller dialing into a group of DNIS numbers associated with a published number representing a business category such as consumer-billing or consumer-repair. In addition, the profile may also contain control codes from an incoming IVR so that the CGU dialog modules can continue a dialog with the caller in an efficient and user-friendly manner. For example, if prior to being sent to the switchboard, the incoming IVR application (e.g., $IVR_1$) already asked the caller to select a language (English, Spanish, or etc.), the IVR application will have an option to create a special control code (e.g., LANG=1 where "1" indicates English as a preferred language by the caller) and then pass the control code with other session variables, such as the TN via a shared session records database 426. Alternatively, an incoming IVR application can choose to send the control codes via an in-band signaling method (such as channel associated signaling (CAS)) to trigger a dual tone multi-frequency (DTMF) reader inside process 410. The DTMF reader reads the control codes generated from the incoming IVR application and uses these codes to modify the logic of the CGU dialog modules accordingly. For example, if the caller already selected the language while being connected to the IVR application, the CGU dialog will not ask the same language question again.

Process 420 employs a selected CGU dialog (most often a highly focused CGU dialog designed specifically for a certain profile such as consumer-billing or business-payment etc) to gather further information about the caller's goal (why they are calling and so on). If the CGU dialog is able to recognize their goal, process 420 sends a confidence score of that recognition to process 421 which controls the decision threshold. The decision threshold may be periodically changed based on an offline tuning database 424. For example, when the switchboard is initially installed, database 424 may only contain the tuning data collected from a few thousands of calls. At that initial stage, process 421 may choose to use a very tight threshold to determine if the confidence score from a CGU dialog is high enough to be acceptable or not. As the size of Database 424 grows over time, the decision threshold may be automatically adjusted to achieve the balance desired (between misunderstanding a customer's goal and rejecting the assessed CGU).

Based on fuzzy logic inside process 420, decision 422 will make a final determination as to whether the confidence score from the CGU dialog is low, medium, or high. If the confidence score is high, IVR Dialog Engine will invoke confirmation module 450 which will inform the caller 1) the goal recognized in terms of a set of pre-defined user tasks, and 2) what the caller can expect next—to be sent to another IVR application or to an agent queue. Then, IVR Dialog Engine will send the task ID along with other session data via link 402 to routing engine 130.

If the threshold is medium, process 414 will load a set of specific direct dialog modules (DDM) based on the outcome of the CGU Dialog Process 420. Such an outcome is represented by a group ID so that DDMs (<ID>) loaded have a focused conversation with the caller to further clarify what they really meant from what they said. For example, if a CGU (<Consumer:Billing>) is not determinative of whether the caller really wants to a) get information about their bill or b) give information about their bill, block 414 can load the two DDMs and then pass the control to process 440. If DDM process 440 is able to successfully recognize the customer's goal with a high confidence, the caller will be sent to confirmation process 450. If decision 444 receives a medium confidence score from process 440, it may choose to load a different CGU dialog and start the customer goal determination process again and by pass the control to Process 420. For example, the DDMs used in Process 440 may reach a conclusion that the call is not really about billing. Instead, what the caller really wants is to pay their bill. If that is the case, a CGU (<Payment>) will be loaded.

If decision 422 considers the confidence score from the CGU dialog process 420 to be low (or a failed recognition generates no confidence score at all), a set of error handling modules (EHM) will be invoked to recover from such a situation such as giving the caller another chance or simply bailing out to process 460, via the call transfer module (CTM).

Depending upon the useful information collected during such a call interactive problem determination session, CTM 468 may decide to set various flags for playing a personalized message when the call is sent to a personalized queue. In addition, CTM 468 can be configured to set a flag for various agent queues such as billing, repair, and etc. When such flags are set, the caller may hear a customized message common to all the callers in that agent queue (instead of meaningless music-on-hold). If the last recognition event (from CGU dialog or DDM dialog) produced an audio recording of the caller's utterance, CTM 468 may compose an appropriate audio message for the agent to listen to. Such an audio message may start with an introduction tone followed by the caller's utterance(s) selected and followed by an ending tone. If there is a confirmed recognition result from the session, a corresponding text message will be formatted to feed CTI 140 via link 469 for a proper screen pop at the agent's desktop. Finally, CTM 468 has an option to prepare a text message related to the session so that the message may be used for an outbound E-channel delivery such as an email notification.

Figure 5:
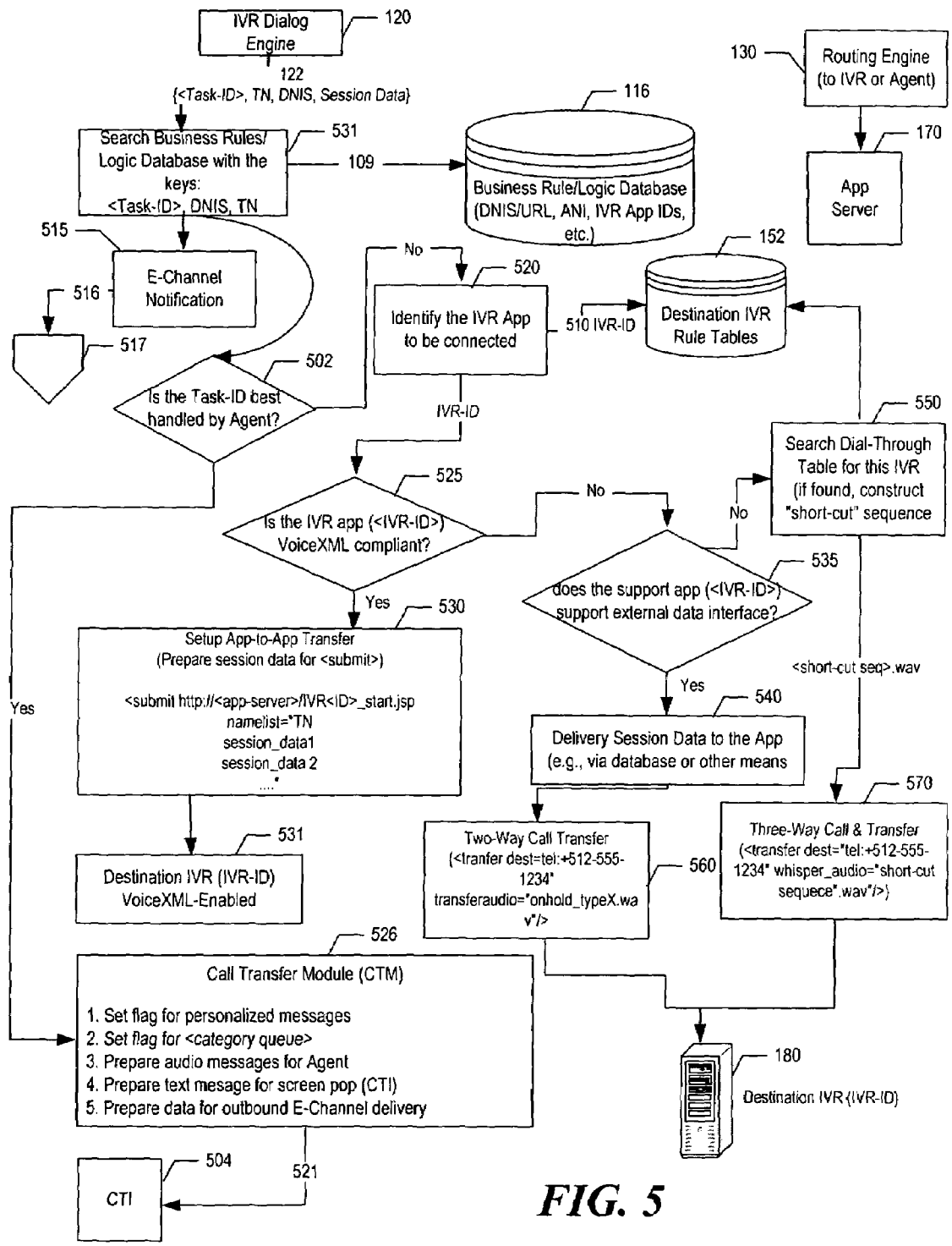
FIG. 5 is a block diagram of an embodiment of a routing engine module.

Referring to FIG. 5, further details of the routing engine module 130 are shown. The routing engine module 130 is coupled to application server 170. Additional inputs received from the IVR dialog engine 120 are received as a task ID, telephone DNIS, and session data 122 at the business rule and logic processing module 531. The task ID, telephone DNIS, and telephone number are passed to each notification module 515 and may be used to access the business rule logic database 116. At decision block 502, the task ID is compared to determine whether agent handling is appropriate. When agent handling is not needed, a particular IVR application is identified at 520 and destination IVR rule tables 152 are accessed.

When IVR identification is retrieved, then processing continues to the decision step 525 to determine if the IVR application is VoiceXML compliant. If so, processing continues to set-up the application to application transferring module 530. In the case where the task ID is best handled by an agent, processing continues at module 526, which accesses a call transfer module. A call transfer module 526 performs steps such as setting a flyer for personalized messages, sending a flag for a category queue, preparing audio messages for the agent, preparing text messages for a screenpop via a CTI, and preparing data for outbound e-channel delivery. Processing is then followed by instruction 521 being communicated to CTI 504 to further interface with the agent terminal.

In the situation where the IVR application is not VoiceXML compliant, at 525, then a determination is made as to whether the IVR application supports an external data interface. If not, processing continues at module 550 to search a dial-through table for the IVR. Thereafter, a three-way call transfer may be made at 570 and routing to a final destination IVR 180 is handled. If the IVR application does support an external data interface, then delivery of session data to the application occurs, at 540, and a two-way call transfer is handled, at module 560, prior to final routing to the destination IVR 180.

In the situation where the IVR application is VoiceXML compliant, at 525, once a pre-defined task is matched during the dialog with the caller (and confirmed), IVR Dialog Engine sends the applicable session data such as <Task-ID>, TN, and DNIS to process 531. Process 531 searches Database 116 to determine how the call should be handled given the business logic or processes associated with such a task. The search process link 109 can be executed by a rule engine which typically resides on a J2EE application server. As a part of the execution logic, decision 502 will determine whether the task should be handled by a live agent instead of being routed to another IVR application. If Yes, the control is passed to process 526 (CTM).

If not, process 520 is invoked to identify a proper IVR (destination IVR-ID) application to be routed and then uses <IVR-ID> to search a database containing destination IVR profiles (Database 152) via link 510. Based on the profile pre-defined for the destination IVR (IVR-ID), decision 525 determines if the IVR is VoiceXML capable. If yes, the caller is essentially sent to another VoiceXML application through process 530 using standards-based application-to-application transfer methods such as <submit> which can easily pass all session related data to the VoiceXML-based IVR application via Link 531.

If the destination IVR is not VoiceXML capable, decision 535 determines whether the IVR is capable of supporting any external data interface to receive the session data. If yes, process 540 is invoked to deliver the session data to the destination IVR via a shared database or using a specific software adapter built specifically for that IVR. After delivering the session data, process 560 is invoked to ask the switchboard to make a two-way transfer by making an outbound call to the destination IVR first and then bridge the call that has been put on hold after confirmation process 450 finally disconnects itself (the switchboard) from the call.

If the destination IVR does not support any external data interface, Process 550 will search if there is any "dial-through" table defined for the IVR from Database 152. If found, Process 550 constructs a single audio file (.wav file) to contain a series of DTMF commands based on the session data collected. For example, if the destination's main menu asks the caller to enter a telephone number (TN) after DTMF-1 is received and then a sub-menu, the audio file generated by process 550 for such a short cut may have a following structure:

| Audio Segment | Silence of 3 seconds | DTMF-1 | Silence of 1 second | DTMF: <10-digit TN> |
|---|---|---|---|---|
| Purpose | Non-interruptible prompt | Menu Selection | Safety buffer | Enter TN |

After such an audio file is constructed, Process 570 is invoked to make a 3-way call transfer. First, the switchboard puts the current call on hold and then makes an outbound call to the destination IVR. Upon the connection, the switchboard plays the audio message containing the short-cut sequence which will guide the destination IVR to a proper menu before connecting the original caller. This method is also known as whisper transfer since the caller will not hear the audio message played. At the end of the playback of the audio message, the switchboard bridges the call to the 3-way connection and then disconnects itself immediately.

The disclosed system uses Voice Extensible Markup Language (VoiceXML) based technology in general and focuses particularly on improving the capability of switching traffic in and out of a centralized call center environment based on changing business needs and dynamics of existing and future IVR applications. The software architecture is particularly applicable to the call center operations of large enterprises where many of their existing IVR applications are written in proprietary programming languages and have to co-exist with VoiceXML-based IVR applications. Rule engines used to power the system may be assembled from various light-weight modules that are specially designed for real-time responses when callers are switched in and out of the switchboard from one IVR to another.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A switchboard system comprising:
   a data module including an input to receive an incoming call, the data module responsive to one or more remote interactive voice response applications and an Internet-based telephony system, the data module to selectively answer the incoming call;
   a first interactive voice response (IVR) dialog module coupled to the data module, the first IVR dialog module responsive to the incoming call to engage a voice dialog with a caller using a set of language models to generate a message;
   a routing engine module coupled to the first IVR dialog module to receive and to decode the message, the routing engine module responsive to a destination IVR rules table and responsive to logic to determine from the decoded message when a live agent is required, and in response to the determination, the routing engine module to route the incoming call to a computer telephony interface when the live agent is required; and wherein the routing engine module is adapted to:
   identify a destination IVR application when the live agent is not required;
   determine if the destination IVR application is VoiceXML capable and send the caller to the destination IVR application when the destination IVR application is VoiceXML capable;
   determine if the destination IVR application is capable of supporting an external data interface when the destination IVR application is not VoiceXML capable and route incoming call session data to the destination IVR application when the destination IVR application is capable of supporting the external data interface; and
   construct an audio file including one or more dual tone multi-frequency (DTMF) commands based on the incoming call session data and send the audio file to the destination IVR application when the destination IVR application is not VoiceXML capable and is not capable of supporting an external data interface.

2. The switchboard system of claim 1, further comprising a customer relationship management (CRM) system to access a contact history of the caller.

3. The switchboard system of claim 2, wherein the CRM system is adapted to determine a personalized message for the caller based on a queue associated with access to the live agent.

4. The switchboard system of claim 2, wherein the CRM system is adapted to route the incoming call to the live agent using a whisper transfer.

5. The switchboard system of claim 2, wherein the CRM system plays a group message based on the message from the first IVR dialog module provided by the routing engine module.

6. The switchboard system of claim 2, wherein the CRM system is coupled to a distributed computer network interface responsive to a computer network to communicate electronic mall messages in response to the routing engine module.

7. The switchboard system of claim 1, wherein the data module is adapted to:
   determine if a dialed number identification service identifier (DNIS) associated with the incoming call is defined; and
   when the DNIS is not defined, play a pre-defined announcement before terminating the incoming call or refrain from answering the incoming call.

8. The switchboard system of claim 1, further comprising a customer relationship management (CRM) system to detect an availability of at least one live agent via the computer telephony interface and to transmit call context data to a display associated with a selected live agent.

9. The switchboard system of claim 8, wherein the CRM system is adapted to play a chained message from one of voice recordings of the caller or a number of concatenated audio messages associated with the message.

10. The switchboard system of claim 1, further comprising an application server coupled to the data module, the IVR dialog module, and the routing engine module, the application server having access to a business logic database to retrieve business rules and logic.

11. The switchboard system of claim 10, wherein the business logic database includes call treatment rules based upon at least one of a customer type, time of day, type of service, type of call, size of customer, and personalized caller information.

12. The switchboard system of claim 11, wherein the routing engine module routes calls using a routing priority based upon the call treatment rules.

13. The switchboard system of claim 1, further comprising a personalized call queue for temporarily holding calls to be routed.

14. The switchboard system of claim 1, further comprising a plurality of automated call response destinations.

15. The switchboard system of claim 14, wherein the plurality of automated call response destinations includes a billing destination, a repair destination, and a bill collection destination.

16. The system of claim 1, further comprising a computer telephony interface responsive to the IVR dialog module, the computer telephony interface coupled to a call center agent terminal and adapted to launch a screen display at the call center agent terminal.

17. The system of claim 16, wherein the screen display is a screen pop that includes session specific information collected from the incoming call and wherein the screen display includes information gathered from a customer relationship manager database.

* * * * *